United States Patent
Fan et al.

(10) Patent No.: US 11,122,522 B2
(45) Date of Patent: Sep. 14, 2021

(54) ELECTRONIC DEVICE IMPLEMENTING POSITIONING INFORMATION TRANSMISSION METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Bin Fan, Shenzhen (CN); Jun Su, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/878,221

(22) Filed: May 19, 2020

(65) Prior Publication Data

US 2021/0195533 A1    Jun. 24, 2021

(30) Foreign Application Priority Data

Dec. 18, 2019    (CN) .......................... 201911311556.1

(51) Int. Cl.
*H04W 52/28*    (2009.01)
*H04W 4/20*    (2018.01)
*H04W 4/029*    (2018.01)
*G08B 6/00*    (2006.01)

(52) U.S. Cl.
CPC ............ *H04W 52/283* (2013.01); *G08B 6/00* (2013.01); *H04W 4/029* (2018.02); *H04W 4/20* (2013.01)

(58) Field of Classification Search
CPC ..... H04W 52/283; H04W 4/20; H04W 4/029; G08B 6/00
See application file for complete search history.

(56) References Cited

U.S. PATENT DOCUMENTS

| 10,594,990 B1* | 3/2020 | Lemberger | H04W 48/18 |
| 2002/0022452 A1* | 2/2002 | Toya | H04B 7/1853 455/13.1 |
| 2005/0009563 A1* | 1/2005 | Stenmark | H04W 8/24 455/558 |
| 2007/0150193 A1* | 6/2007 | Sin | G01C 21/00 701/484 |
| 2014/0372598 A1* | 12/2014 | Ferre | H04W 52/028 709/224 |
| 2018/0048700 A1* | 2/2018 | Gummadi | H04W 48/18 |

* cited by examiner

*Primary Examiner* — Yuwen Pan
*Assistant Examiner* — Hung K Du
(74) *Attorney, Agent, or Firm* — ScienBiziP, P.C.

(57) ABSTRACT

A communication device includes a positioning unit and a communication unit. The positioning unit obtains positioning information of the electronic device when the electronic device is turned on or off. The communication unit sends the positioning information to a base station of a communication operator of the electronic device at preset time intervals. Whether the base station has received the positioning information is determined. If the base station has not received the positioning information, the communication unit increases a transmission power for transmitting a signal and sends the high-frequency signal carrying the positioning information of the electronic device to a communication satellite.

12 Claims, 3 Drawing Sheets

ELECTRONIC DEVICE IMPLEMENTING POSITIONING INFORMATION TRANSMISSION METHOD

FIELD

The subject matter herein generally relates to positioning information of an electronic device, and more particularly to an electronic device implementing a method for transmitting positioning information of the electronic device.

BACKGROUND

Most electronic devices are equipped with a GPS positioning module. However, the GPS positioning module generally works only when the electronic device is turned on. When the electronic device is lost or stolen, as long as the electronic device is turned off, the electronic device cannot be found by tracking positioning information of the electronic device. Furthermore, when a user of the electronic device is lost or in danger for a long time and the electronic device runs out of battery, the user cannot be found by the positioning information of the electronic device.

BRIEF DESCRIPTION OF THE DRAWINGS

Implementations of the present disclosure will now be described, by way of embodiments, with reference to the attached figures.

DETAILED DESCRIPTION

Figure 1:
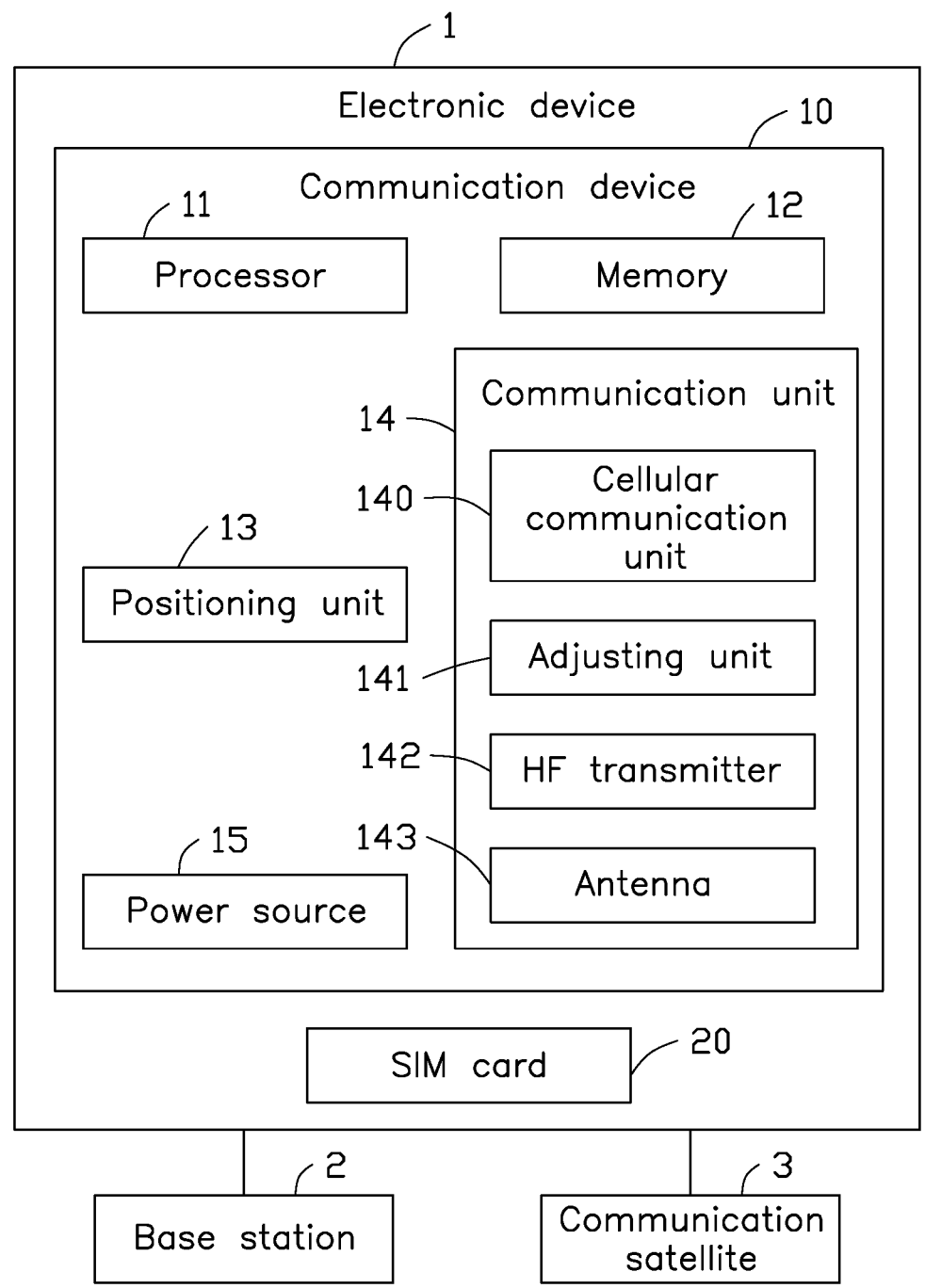
FIG. 1 is a schematic block diagram of an embodiment of an electronic device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a schematic diagram of an application environment of an electronic device 1. The electronic device 1 may be a smartphone or a tablet computer. The electronic device 1 includes, but is not limited to, a communication device 10 and a SIM card 20. FIG. 1 illustrates only one example of the electronic device 1, other examples can include more or fewer components than illustrated, or have a different configuration of the various components in other embodiments.

The communication device 10 includes, but is not limited to, a processor 11, a memory 12, a positioning unit 13, a communication unit 14, and a power source 15.

In at least one embodiment, the memory 12 can include various types of non-transitory computer-readable storage mediums. For example, the memory 12 can be an internal storage system, such as a flash memory, a random access memory (RAM) for temporary storage of information, and/or a read-only memory (ROM) for permanent storage of information. The memory 12 can also be an external storage system, such as a hard disk, a storage card, or a data storage medium. The processor 11 can be a central processing unit (CPU), a microprocessor, or other data processor chip that performs functions of the electronic device 1.

The positioning unit 13 is a Global Positioning System (GPS) device. The power source 15 is a rechargeable high-performance power source for supplying power to the communication device 10. In other embodiments, the power source 15 may be an independent power source which can provide power to the communication device 10 when the electronic device 1 is powered off.

In at least one embodiment, the communication unit 14 includes, but is not limited to, a cellular communication unit 140, an adjusting unit 141, a high-frequency (HF) transmitter 142, and an antenna 143. The cellular communication unit 140 is configured to establish cellular communication with a base station 2 of an operator. The adjusting unit 141 is a transmission power adjustment chip and is configured to adjust a transmission power when the communication unit 14 sends a signal. The high-frequency transmitter 142 is configured to generate a high-frequency signal. The antenna 143 is a retractable antenna for transmitting the high-frequency signal.

The communication device 10 is a mobile satellite communication device which can communicate with the base station 2 and a communication satellite 3 of a communication operator. The electronic device 1 can implement cellular communication and satellite communication through the communication device 10. The cellular communication may be a 2G communication, 3G communication, 4G communication, or 5G communication connection.

Figure 2:
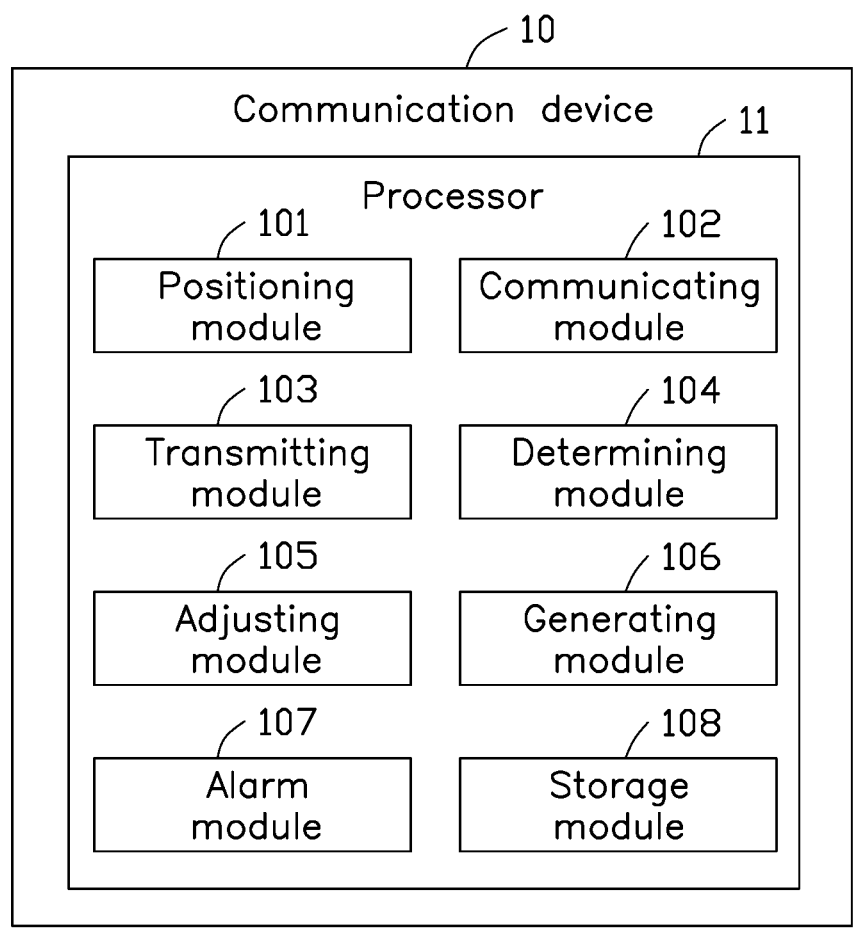
FIG. 2 is a schematic block diagram of modules of a communication device of the electronic device.

Referring to FIG. 2, the communication device 10 includes at least a positioning module 101, a communicating module 102, a transmitting module 103, a determining module 104, an adjusting module 105, a generating module 106, an alarm module 107, and a storage module 108. The modules 101-108 also can include functionality represented as hardware or integrated circuits, or as software and hardware combinations, such as a special-purpose processor or a general-purpose processor with special-purpose firmware.

The positioning module 101 is configured to control the positioning unit 13 to obtain a position of the electronic device 1 when the electronic device 1 is turned on or off.

In one embodiment, the positioning module 101 controls the positioning unit 13 to obtain the position of the electronic device 1 in real time to obtain positioning information of the electronic device 1. The positioning information is longitude and latitude information.

The communicating module 102 is configured to control the communication unit 14 to communicate with the base station 2 of the communication operator of the electronic device 1.

In one embodiment, the communicating module 102 determines the communication operator through the SIM card 20, and determines the base station 2 closest to the electronic device 1 among multiple base stations 2 of the communication operator based on a cellular signal strength, and then controls the cellular communication unit 140 to communicate with the base station 2. The communication connection between the communication unit 14 and the base station 2 may be a 2G, 3G, 4G, or 5G communication connection.

The transmitting module 103 is configured to control the communication unit 14 to send the positioning information of the electronic device 1 to the base station 2 at preset time intervals. In one embodiment, the preset time interval is one minute. In other embodiments, the preset time may be set according to requirements.

The determining module 104 is configured to determine whether the base station 2 has received the positioning information of the electronic device 1.

In one embodiment, when the base station 2 receives the positioning information of the electronic device 1, the base station 2 will automatically send a feedback message to the communication unit 14 of the electronic device 1. Therefore, the determining module 104 determines whether the communication unit 14 has received the feedback information sent by the base station 2 to determine whether the base station 2 has received the positioning information of the electronic device 1.

The adjusting module 105 is configured to control the communication unit 14 to increase a transmission power if the determining module 104 determines that the base station 2 of the communication operator has not received the positioning information of the electronic device 1.

In one embodiment, when the communication unit 14 does not receive the feedback information sent by the base station 2, the determining module 104 determines that the base station 2 has not received the positioning information of the electronic device 1. At this time, the adjusting module 105 is configured to control the adjusting unit 141 to increase the transmission power when the communication unit 14 sends signals.

In one embodiment, when the communication unit 14 is communicatively connected to the base station 2 and the positioning information of the electronic device 1 is transmitted to the base station 2, the transmission power of the communication unit 14 is 2 watts. In order to send a high-frequency signal to the communication satellite 3 through the communication unit 14, the adjusting unit 141 adjusts the transmission power of the communication unit 14 to 20 watts. At this time, the power supply 15 provides a voltage of 5V and a current of 4 A.

The generating module 106 is configured to control the communication unit 14 to generate a high-frequency signal carrying the positioning information and/or alarm information.

In one embodiment, the generating module 106 is configured to control the high-frequency transmitter 142 to generate a high-frequency signal that carries the positioning information and/or alarm information. The high-frequency signal is an electromagnetic wave having an L-band frequency. In other embodiments, the high-frequency signal is an electromagnetic wave in a band that can be received by other communication satellites.

The transmitting module 103 is further configured to control the communication unit 14 to send a high-frequency signal carrying positioning information and/or alarm information of the electronic device 1 to the communication satellite 3, and then the communication satellite 3 transmits the high-frequency signal carrying the positioning information and/or alarm information of the electronic device 1 to the base station 2 of the communication operator.

In one embodiment, the transmitting module 103 controls the antenna 143 to send a high-frequency signal carrying the positioning information and/or alarm information of the electronic device 1 to the communication satellite 3.

The alarm module 107 is configured to control the electronic device 1 to output the alarm information when the determining module 104 determines that the base station 2 of the communication operator has not received the positioning information of the electronic device 1. In one embodiment, the alarm information may be a short message or information that can be edited and stored in the memory 12 and can be generated by the generating module 106. For example, the message may say, "I am xxx, save me" or "I am xxx, I have now entered the no-signal zone. If I do not reply to you within 2 minutes, please call me and notify xxx" and so on.

In other embodiments, the alarm information further includes a ringtone or a vibration to alert that the base station 2 has not received the positioning information of the electronic device 1 and to prompt a user to forward the positioning information and/or the alarm information within a preset time (for example, 30 s) to the communication satellite 3.

Further, if the user does not need an alarm, the user can input a password and press a "Cancel" button within a preset time to cancel sending the alarm information, thereby avoiding unnecessary trouble for a preset receiver.

The storage module 108 is configured to store the current positioning information of the electronic device 1 and the information of the SIM card 20 to the memory 12 when the SIM card 20 is removed from the electronic device 1. In one embodiment, the information of the SIM card 20 includes, but is not limited to, an address book, a call record, and a short message record.

The communication device 10 has a waterproof and dustproof function, can work under extreme environmental conditions, and can directly communicate with GPS, Beidou, and Global Navigation Satellite System (GLONASS) satellites. In this way, when the electronic device 1 is turned off and the cellular signal in the environment is weak and cannot work normally, the communication device 10 can still work normally to obtain the positioning information of the electronic device 1 and send the positioning information and/or the alarm information to the base station 2 or the communication satellite 3.

Figure 3:
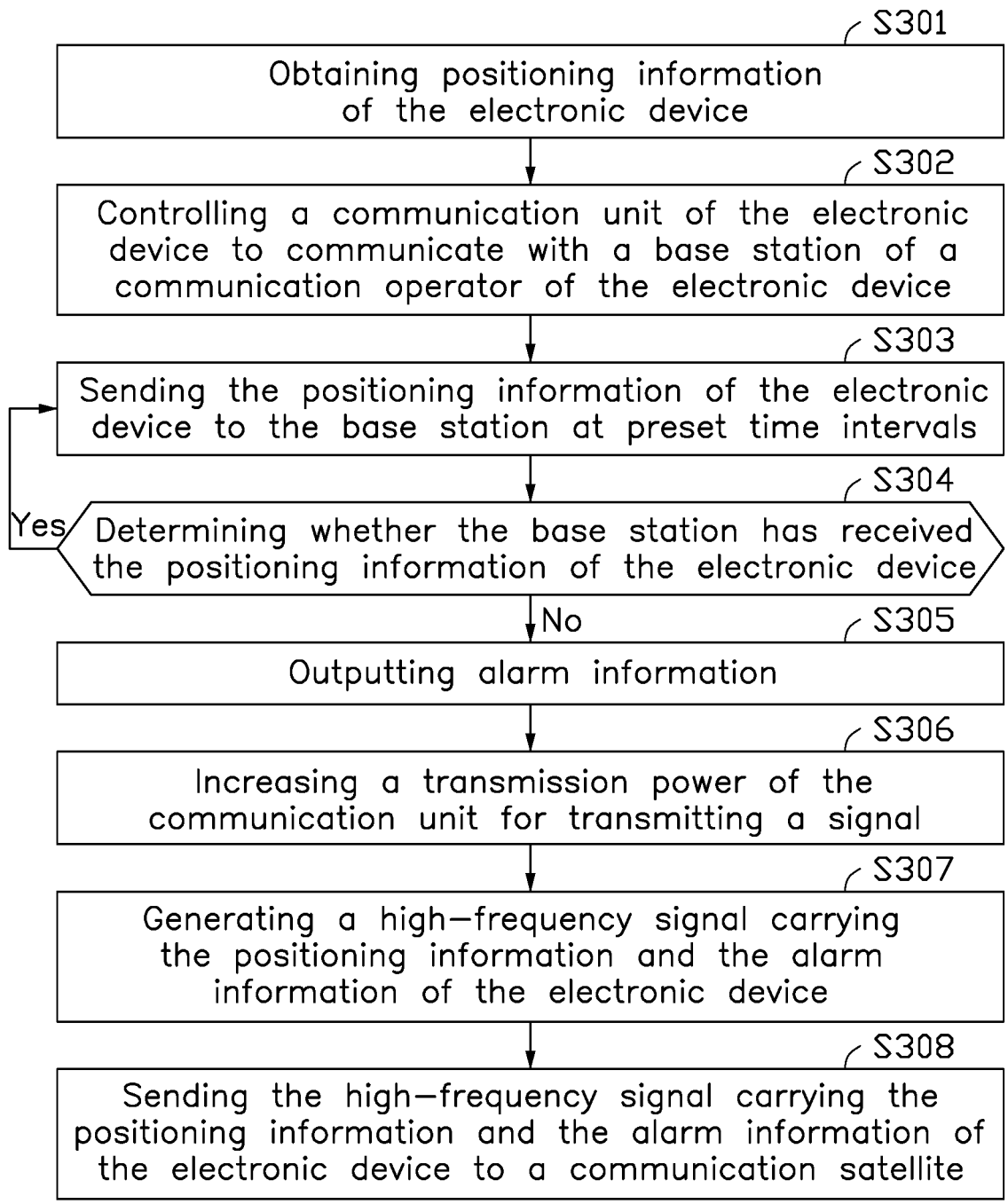
FIG. 3 is a flowchart of a positioning information transmission method.

FIG. 3 shows a flowchart of a positioning information transmission method. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S301.

At block S301, when the electronic device 1 is turned on or off, the positioning unit 13 is controlled to obtain positioning information of the electronic device 1.

At block S302, the communication unit 14 is controlled to communicate with the base station 2 of the communication operator of the electronic device 1.

At block S303, the communication unit 14 is controlled to send the positioning information of the electronic device 1 to the base station 2 of the communication operator at preset time intervals.

At block S304, whether the base station 2 of the communication operator has received the positioning information of the electronic device 1 is determined. When it is determined that the base station 2 of the communication operator has not received the positioning information of the electronic device, block S305 is implemented. When it is determined that the base station 2 of the communication operator has received the positioning information of the electronic device, block S303 is repeated.

At block S305, the electronic device 1 is controlled to output alarm information.

At block S306, the communication unit 14 is controlled to increase the transmission power for transmitting a signal.

At block S307, the communication unit 14 is controlled to generate a high-frequency signal carrying the positioning information and the alarm information of the electronic device 1.

At block S308, the communication unit 14 is controlled to send the high-frequency signal carrying the positioning information and the alarm information of the electronic device 1 to the communication satellite 3. The communication satellite 3 transmits the high-frequency signal carrying the positioning information and the alarm information of the electronic device 1 to the base station 2 of the communication operator.

In one embodiment, the method further includes the following: when the SIM card 20 is removed from the electronic device 1, the current positioning information of the electronic device 1 and the information of the SIM card 20 are stored to the memory 12.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising a communication device, the communication device comprising:
   a positioning unit;
   a communication unit;
   a processor; and
   a memory storing a plurality of instructions, which when executed by the processor cause the processor to:
   control the positioning unit to obtain positioning information of the electronic device when the electronic device is turned on or off;
   control the communication unit to send the positioning information of the electronic device to a base station of a communication operator of the electronic device at preset time intervals, wherein when the communication unit sends the positioning information of the electronic device to the base station, a transmission power of the communication unit is 2 watts;
   determine whether the base station of the communication operator has received the positioning information of the electronic device;
   if the base station has not received the positioning information, control the communication unit to increase a transmission power for transmitting a signal;
   control the communication unit to generate a high-frequency signal carrying the positioning information of the electronic device; and
   control the communication unit at the preset time intervals to send the high-frequency signal carrying the positioning information of the electronic device to a communication satellite, wherein when the communication unit sends the high-frequency signal carrying the positioning information of the electronic device to the communication satellite, the transmission power of the communication unit is 20 watts.

2. The electronic device of claim 1, wherein:
   the communication unit comprises an adjustment device, a high-frequency transmitter, and an antenna;
   the processor controls the adjustment device to adjust the transmission power when transmitting a signal;
   the processor controls the high-frequency transmitter to generate the high-frequency signal carrying the positioning information of the electronic device; and
   the processor controls the antenna at the preset time intervals to send the high-frequency signal carrying the positioning information of the electronic device to the communication satellite.

3. The electronic device of claim 2, wherein:
   the communication unit further comprises a cellular communication device; and
   the processor controls the cellular communication device to send the positioning information of the electronic device to the base station of the communication operator.

4. The electronic device of claim 1, wherein when it is determined that the base station of the communication operator has not received the positioning information of the electronic device, the processor is further configured to:
   control the electronic device to output alarm information; and
   control the communication unit to send the alarm information with the positioning information in the high-frequency signal to the communication satellite.

5. The electronic device of claim 4, wherein:
   the alarm information is a short message or a vibration.

6. The electronic device of claim 1, further comprising a SIM card, wherein the processor is further configured to:
   when the SIM card is removed from the electronic device, store the current positioning information of the electronic device and information of the SIM card to the memory.

7. A positioning information transmission method implemented in an electronic device, the electronic device comprising a communication device comprising a positioning unit and a communication unit, the method comprising:

obtaining, by the positioning unit, positioning information of the electronic device when the electronic device is turned on or off;

sending, by the communication unit, the positioning information of the electronic device to a base station of a communication operator of the electronic device at preset time intervals, wherein when the communication unit sends the positioning information of the electronic device to the base station, a transmission power of the communication unit is 2 watts;

determining whether the base station of the communication operator has received the positioning information of the electronic device;

if the base station has not received the positioning information, increasing a transmission power of the communication unit for transmitting a signal;

generating, by the communication unit, a high-frequency signal carrying the positioning information of the electronic device; and sending, by the communication unit at the preset time intervals, the high-frequency signal carrying the positioning information of the electronic device to a communication satellite, wherein when the communication unit sends the high-frequency signal carrying the positioning information of the electronic device to the communication satellite, the transmission power of the communication unit is 20 watts.

8. The positioning information transmission method of claim 7, wherein:

the transmission power of the communication unit is increased by an adjustment device of the communication unit;

the high-frequency signal carrying the positioning information of the electronic device is generated by a high-frequency transmitter of the communication unit; and the high-frequency signal carrying the positioning information of the electronic device is sent at the preset time intervals to the communication satellite by an antenna of the communication unit.

9. The positioning information transmission method of claim 8, wherein:

the positioning information of the electronic device is sent to a base station of the communication operator by a cellular communication device of the communication unit.

10. The positioning information transmission method of claim 7, wherein when it is determined that the base station of the communication operator has not received the positioning information of the electronic device, the method further comprises:

outputting alarm information; and sending, by the communication unit, the alarm information with the positioning information in the high-frequency signal to the communication satellite.

11. The positioning information transmission method of claim 10, wherein:

the alarm information is a short message or a vibration.

12. The positioning information transmission method of claim 7, further comprising:

when a SIM card is removed from the electronic device, storing the current positioning information of the electronic device and information of the SIM card to the memory.

* * * * *